No. 658,505. Patented Sept. 25, 1900.
G. P. O'CONNOR.
EMBOSSING MACHINE.
(Application filed May 18, 1900.)
(No Model.) 3 Sheets—Sheet 1.

Witnesses:
Walter E. Lombard.
Jennie A. Bacon.

Inventor:
George P. O'Conner,
by N. C. Lombard
Atty.

No. 658,505. Patented Sept. 25, 1900.
G. P. O'CONNOR.
EMBOSSING MACHINE.
(Application filed May 18, 1900.)
(No Model.) 3 Sheets—Sheet 2.
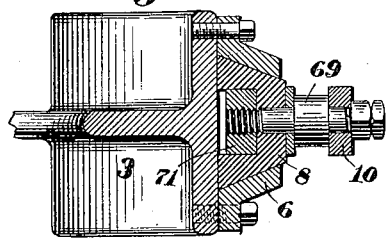
Fig. 3.
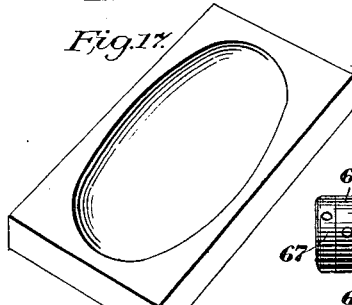
Fig. 17.
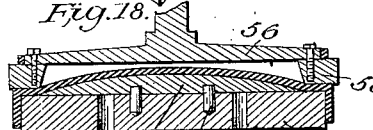
Fig. 18.
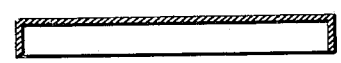
Fig. 19.
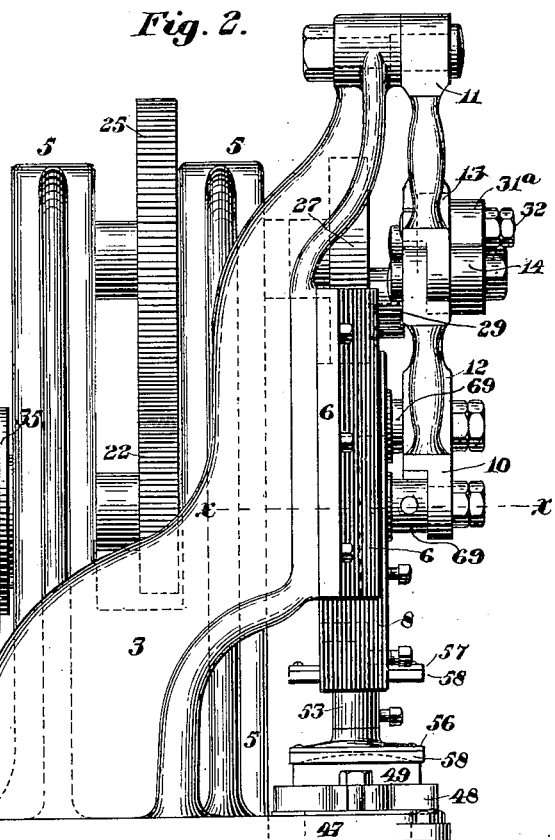
Fig. 2.
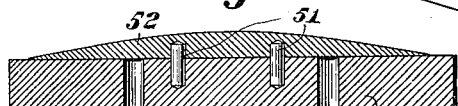
Fig. 5.
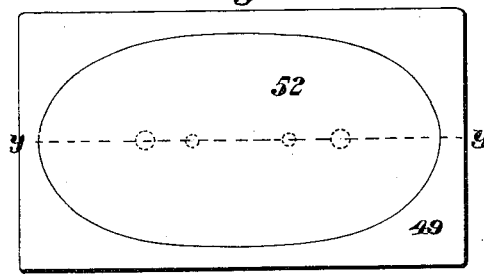
Fig. 4.
Witnesses:
Walter E. Lombard.
Jerome A. Bacon
Inventor:
George P. O'Conner,
by N. C. Lombard
Atty.
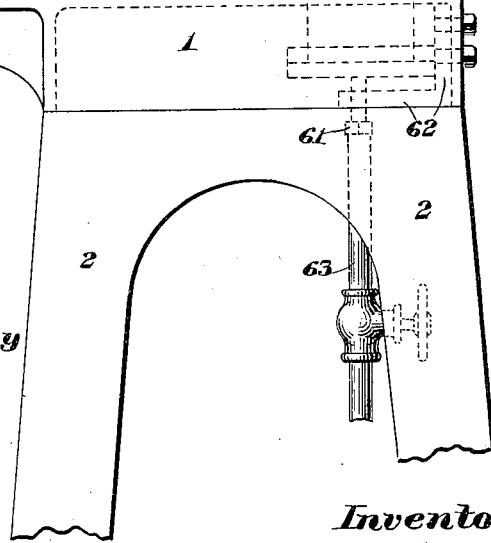
THE NORRIS PETERS CO., PHOTO-LITHO., WASHINGTON, D. C.

No. 658,505. Patented Sept. 25, 1900.
G. P. O'CONNOR.
EMBOSSING MACHINE.
(Application filed May 18, 1900.)
(No Model.) 3 Sheets—Sheet 3.

Witnesses:
Walter E. Lombard.
Jerome A. Bacon.

Inventor:
George P. O'Conner,
by N. C. Lombard
Atty.

THE NORRIS PETERS CO., PHOTO-LITHO., WASHINGTON, D. C.

UNITED STATES PATENT OFFICE.

GEORGE P. O'CONNOR, OF CAMBRIDGE, MASSACHUSETTS, ASSIGNOR TO CHARLES PLACE, OF SAME PLACE.

EMBOSSING-MACHINE.

SPECIFICATION forming part of Letters Patent No. 658,505, dated September 25, 1900.

Application filed May 18, 1900. Serial No. 17,151. (No model.)

*To all whom it may concern:*

Be it known that I, GEORGE P. O'CONNOR, of Cambridge, in the county of Middlesex and State of Massachusetts, have invented certain new and useful Improvements in Embossing-Machines, of which the following, taken in connection with the accompanying drawings, is a specification.

My invention relates to embossing-machines, and is designed more especially for embossing the covers of paper or pasteboard boxes after said covers have been made up with smooth flat tops; and it consists in certain novel features of construction, arrangement, and combination of parts, which will be readily understood by reference to the description of the accompanying drawings and to the claims hereto appended and in which my invention is clearly pointed out.

Figure 1:
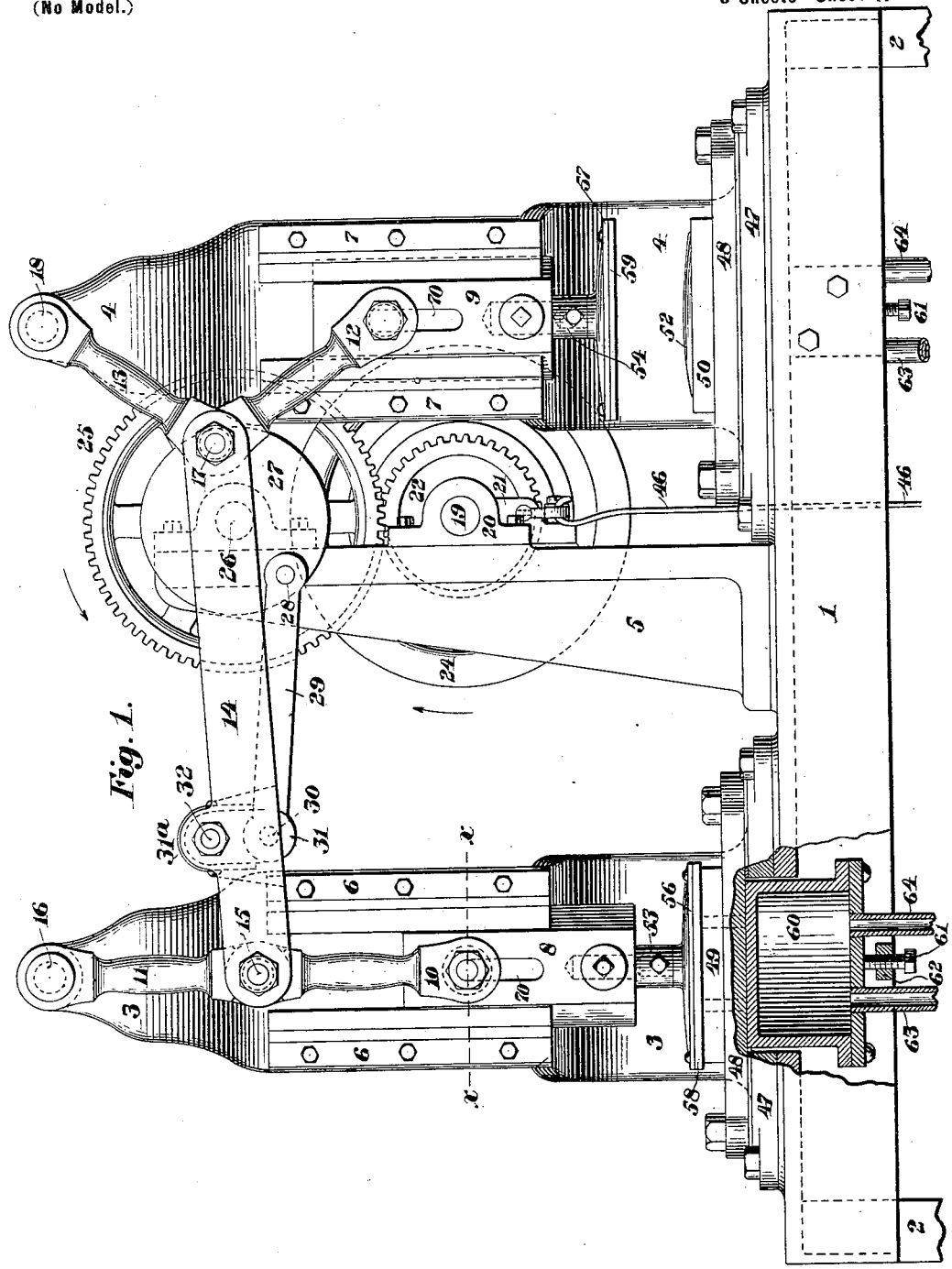
Figure 7:
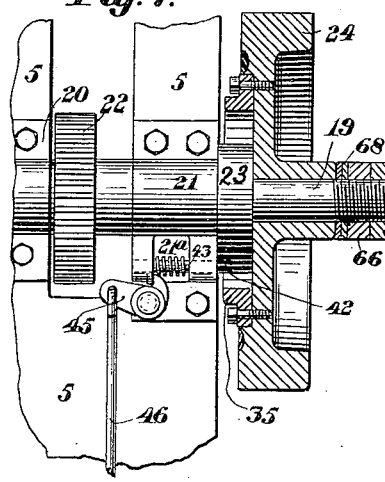
Figures 8, 9:
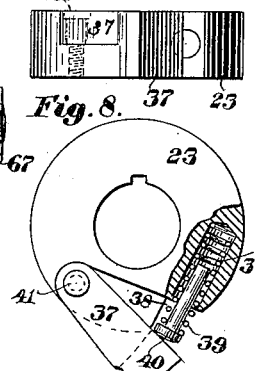
Figure 6:
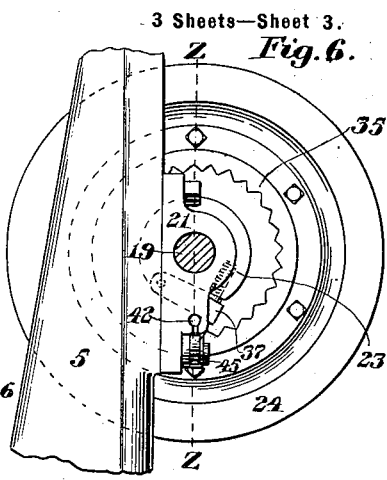
Figure 10:
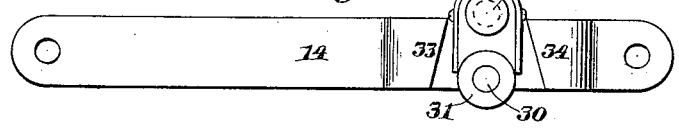
Figure 11:
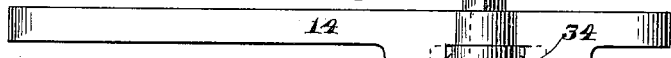
Figures 12, 16:
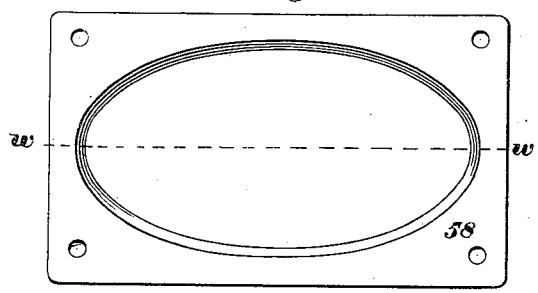
Figure 13:
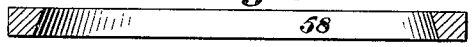
Figures 14, 15:

Figure 1 of the drawings is a front elevation of a machine embodying my invention with a small portion cut in section to show the die-heating steam-chest. Fig. 2 is an end elevation of the same looking at the left-hand end of Fig. 1. Fig. 3 is a horizontal section through one press-stand on line $x\ x$ on Figs. 1 and 2. Fig. 4 is a plan of the lower die and its carrier-plate. Fig. 5 is a section on line $y\ y$ on Fig. 4. Fig. 6 is an elevation of the driving-clutch pulley looking toward the rear of the machine. Fig. 7 is a vertical section through said pulley on line $z\ z$ on Fig. 6 and showing the pawl, pawl-carrier, and pawl-operating mechanism in elevation, the pawl being disengaged from the ratchet. Fig. 8 is a sectional elevation of the pawl and pawl-carrier. Fig. 9 is an edge view of said pawl and pawl-carrier. Fig. 10 is an elevation of the rear side of the rod or bar for coupling the center joints of the two toggles, with a supplementary lever pivoted thereto. Fig. 11 is a plan of the same. Fig. 12 is an inverted plan of an upper die. Fig. 13 is a section of the same on line $w\ w$ on Fig. 12. Figs. 14 and 15 are respectively a front elevation and an end elevation of the upper-die carrier, and Fig. 16 is a section on line $z\ z$ on Fig. 6. Fig. 17 is a perspective view of a box-cover as it appears after being embossed by the dies represented in the drawings. Fig. 18 is a longitudinal section of a box-cover as made up prior to the operation of embossing. Fig. 19 is a vertical section through one pair of the dies, with a box-cover between them, after the embossing has taken place. Figs. 4, 5, 8, 9, 12, 13, 14, 15, and 16 are drawn to an enlarged scale.

In the drawings, 1 is the bed or table of the machine, supported upon the legs 2 2, only portions of which are shown in the drawings.

To the upper surface of the bed 1 are firmly bolted the two press-frames 3 and 4 and the shaft-supporting stand 5, as shown in Figs. 1 and 2. The frames 3 and 4 have secured to their front sides the guide-bars 6 6 and 7 7, respectively, which form guideways for the vertically-movable plungers 8 and 9, respectively, to the front of which are adjustably secured the lower ends of the toggle-links 10 and 12, respectively. The toggle-link 10 is pivoted at its upper end to the link 11 and one end of the connecting-rod 14 by the pin 15, and the upper end of the link 11 is pivoted at 16 to the upper end of the frame 3, as shown. The toggle-link 12 is in like manner pivoted at its upper end to the link 13 and to the connecting-rod 14 by the pin 17, and the upper end of the toggle-link 13 is pivoted to the upper end of the frame 4 at 18, as shown. The connecting-rod 14 is made of such a length that when one pair of toggle-links are straightened or so that their pivotal centers are in the same plane, as shown at the left end of Fig. 1, the other pair of toggle-links will stand at an angle to each other, as shown at the right-hand end of Fig. 1, so that when one pair of dies are clamped upon an article to be embossed the other pair of dies will be separated in position to permit the removal of an embossed article and the placing upon the lower die an unembossed article to be acted upon at the next descent of the upper die of said pair.

The driving-shaft 19 is mounted in the boxes 20 and 21, secured to the stand 5, and has firmly secured thereon, so as to revolve therewith, the gear-wheel 22 and the pawl-carrying disk 23 and loosely mounted thereon, so as to revolve upon or with said shaft, the clutch-pulley 24. The gear-wheel 22 engages and imparts motion to the gear-wheel 25, firmly secured upon the shaft 26, mounted in bearings secured to the stand 5 directly above the shaft 19, said shaft 26 also having firmly secured upon its front end the disk 27, in the front face of which is set the crank-pin 28, upon which is fitted one end of the connecting-rod 29, the other end of which is mounted upon the pin 30, set in the pendent lever 31, fulcrumed upon the pin 32, set in the connecting-rod 14, said lever 31 depending from said pin 32 between the diverging shoulders or abutments 33 and 34, formed on the rear face of said rod 14, so that twice in each revolution of the disk 27 or immediately after the crank-pin 28 has passed either dead-center the lever 31 will move about its fulcrum-pin from contact with one shoulder or abutment 33 or 34 to contact with the other of said shoulders before any movement of the connecting-rod 14 or of the toggles takes place.

The clutch-pulley 24 has formed thereon or secured thereto the annular ratchet 35, having obtuse V-shaped notches in its inner periphery, the two walls of which are at a right angle, or nearly so, to each other, as shown in Fig. 6.

Within the circle of the ratchet 35 the disk 23, having a portion of its thickness at one side cut away to form a seat for the shank of the pawl 37, is secured to the shaft 19 by a spline and keyway, as shown in Fig. 16. The disk 23 has a triangular notch 38 extending across its periphery at one end of the reduced portion thereof to receive the operating end of the pawl 37, which is made as thick as the disk 36. The disk 23 has formed in one wall of said notch 38 a circular chamber 36, in which are fitted a coiled spring 39 and plunger 40 to act upon the pawl 37 to move it outward about its pivot 41 and cause the outer corner of its movable or free end to engage a notch in said ratchet, thereby causing the shaft 19 to be revolved with the pulley 24 until said pawl is disengaged from said ratchet.

A pawl-tripping pin 42 is mounted in bearings in the box or stand 21 and has set therein a stop-pin 43 and a pin or shoulder 44, against which the toe of the short arm of the lever 45 acts to retract said pin against the tension of a coiled spring surrounding said pin 42 between the stop-pin 43 and the left-hand side of the mortise 21ª, cut through the lower part of the box 21, as shown in Figs. 7 and 16. The long arm of the lever 45 has connected thereto the rod or wire 46, the lower end of which is connected to a treadle, (not shown,) but mounted upon the floor and so arranged that a pressure of the foot upon the treadle will cause a retraction of the pin 42, when the reaction of the spring 39 will cause the pawl 37 to engage one of the notches in the ratchet-ring 35. If when the treadle has been depressed the foot is instantly removed from the treadle, the pin 42 will be projected into the space just outside of the periphery of the disk 23, and as the disk is revolved the outer surface of the pawl 37 comes in contact with said pin and is moved into the position shown in Fig. 6, thereby disengaging the pawl from engagement with the ratchet-teeth.

The forwardly-projecting base-flange 47 of each frame 3 and 4 has secured thereon a plate 48, in which are set a pair of upwardly-projecting pins, (shown in dotted lines in Figs. 1 and 4,) which enter holes in the lower-die carrier-plates 49 and 50 to register the same and hold them in position, said carrier-plates 49 and 50 being made of a width and length to fit the interior of the box-cover, the rims of which partially inclose said plates.

Upon each plate 49 and 50 is fitted and held in position by the registering-pins 51 the composition die 52, the outline of which in the case illustrated is an oval or ellipse, and its upper surface is curved both longitudinally and transversely.

The plungers 8 and 9 have secured in sockets in their lower ends the socketed studs 53 and 54, respectively, in the sockets of which are respectively secured the shanks 55 of the die-carriers 56 and 57, respectively, to which are secured by screws the upper dies 58 and 59, respectively. The dies 58 and 59 have oval openings cut therethrough, the walls of which openings are inclined inward, as shown in Fig. 13, to permit the convex ovals of the stationary dies to project upward into said cavity, the lower inner corners of said upper dies 58 and 59, bounding the openings therein, coöperating with the outer perimeter of the convex oval dies 52 to define the outline of the raised convex oval figure to be formed on the box-cover, as shown in Fig. 17, it having been found unnecessary that the upper or female die should be made to conform to the convex upper surface of the male die except in outline. The design to be produced upon a box-cover by the machine, as illustrated, is a smooth convex oval, as shown in Fig. 17; but it is obvious that various forms of embossed figures may be produced by simply replacing the dies illustrated by others having the desired designs formed thereon.

The upper portion of the lever 31 has secured thereto a strap of leather 31ª, which extends downward upon each edge thereof to serve as a cushion between said lever and the shoulders 33 and 34.

A steam-chamber 60 is placed beneath and in contact with each plate 48, openings being cut through the flanges 47 and the bed of the machine to permit the placing of said steam-chamber in contact with said plate, as shown in Fig. 1. The steam-chamber 60 is held in contact with said plate by the set-screw 61, set in the stand 62, secured to the front rib of the bed 1, as shown in Figs. 1 and 2, the latter in dotted lines, and said chamber is provided with suitable inlet and outlet pipes 63 and 64, respectively, which are provided with shut-off valves 65, as shown in Fig. 2.

The clutch-pulley is secured upon its shaft by a nut 66 and check-nut 67 on the rear end of said shaft with one or more washers of leather 68 between said nut 66 and the end of the hub of said pulley.

The lower ends of the toggles are adjustably secured to the plungers 8 and 9 by means of the screw-studs 69, passing through the slots 70 in said plungers and screwed into the rectangular nuts 71, fitted to grooves in the rear sides of said plungers, as shown in Fig. 3.

The operation of my invention is as follows: The several parts of the machine being in the positions shown in Figs. 1, 2, 6, 7, and 16 and a belt from the main or counter shaft being placed upon the pulley 24, said pulley will revolve freely upon the shaft 19 without affecting the other parts of the machine. The operator then places a box-cover or other article to be embossed upon the die-holder 50 and die 52, depresses the movable end of the treadle, and immediately releases it again. The depression of the treadle acting through the rod 46 depresses the front end of the lever 45, thereby retracting the pin 42 from engagement with the pawl 37, when the tension of the spring 39 causes the pawl 37 to engage a tooth of the ratchet 35, thereby causing the disk 23, the shaft 19, and gear 22 to revolve with said pulley. The immediate releasing of the treadle permits the spring surrounding the pin 42 to project said pin into the path of the revolving pawl 37 before it has made a complete revolution about the axis of the shaft 19, and said pawl coming in contact with the periphery of said pin 42 is moved into the position shown in Fig. 6, when the motion of the shaft 19 ceases before the lever 31 moves in the opposite direction to that just completed a sufficient distance to come in contact with the shoulder 33 or 34 that is for the time being farthest from said lever. The gears 22 and 25 having diameters of two to one and the clutch mechanism being arranged to be tripped or disengaged once to each revolution of the shaft 19, it follows that the straightening of one toggle and the breaking of the other toggle are completed just as the crank-pin 28 passes each dead-center, and the operation of the machine is arrested at the same time and remains inoperative until the treadle is again depressed. When the plunger 9 descends and the dies 50, 52, and 59 are clamping an article between them and the clutch-pawl is tripped and the motions of the plungers are arrested, the operator removes the embossed article from the die 49 52 and places another article thereon to be embossed, then depresses the treadle again, and the plunger 8 and die 58 descend to clamp said article and emboss it to the form of the fixed die 52. The article being held between said dies and for a fraction of time exposed to the heat of the stationary die sets the embossing so that it will retain its shape.

What I claim as new, and desire to secure by Letters Patent of the United States, is—

1. In an embossing-machine, the combination of two press-frames arranged side by side at a convenient distance apart; a pair of stationary male dies arranged one upon each of said frames, with their operating-faces in the same horizontal plane; a vertically and intermittently reciprocating plunger carried by each of said frames, and movable in different but parallel planes; a female die carried by each of said plungers, and arranged to coöperate with said stationary male dies to emboss an article placed on said male dies; a revoluble crank-shaft; a crank carried by said shaft; means connecting said crank and plungers, and movable substantially at right angles to the movement of said plungers; and means for intermittently rotating said crank, with a period of rest after each half-revolution thereof.

2. In an embossing-machine, the combination of a pair of press-frames arranged side by side at a convenient distance apart; a vertically-movable plunger fitted to suitable guideways on each of said frames; a stationary die secured in position beneath each of said plungers; a movable die carried by each of said plungers; a pair of toggle-links pendently supporting each of said plungers from the top of its frame; a rod connecting the central joints of said toggles with each other, and having such a length that when the links of one toggle are perpendicular, and its plunger is in its lowest position the links of the other toggle will be at an angle to each other and its plunger and the die carried thereby will be raised to its highest position; and means for imparting to said rod an endwise-reciprocating movement with a standstill at the end of each endwise movement of said rod.

3. In an embossing-machine, the combination of a pair of press-frames arranged side by side at a convenient distance apart; a pair of vertically-movable plungers fitted to suitable guideways on said frames; a stationary die secured in a fixed position beneath each of said plungers; a movable die carried by each of said plungers and adapted to coöperate with said stationary die to emboss an article placed thereon; a pair of toggles connected at one end to said plungers and at their other end to their frames; a rod connecting the central joints of said toggles with each other, and having a length between pivotal centers different to the distance between the centers of said plungers, and provided with the divergent shoulders 33 and 34; the lever 31 pivoted to said rod and depending between said shoulders; the shaft 26; the crank-disk 27 secured upon and revoluble with said shaft 26; the crank-pin 28; the connecting-rod 29 mounted at one end upon said crank-pin, and pivoted at its other end to the lower end of the lever 31; and means for imparting to said shaft 26 an intermittent rotation, with a period of rest at the end of each half-revolution thereof.

4. In an embossing-machine the combination of a pair of press-frames arranged side by side at a convenient distance apart; a pair of vertically-movable plungers fitted to suitable guideways on said frames; a stationary die secured in position beneath each of said plungers; a movable die carried by each of said plungers and adapted to coöperate with a stationary die to emboss an article placed thereon; a pair of toggles connected to said plungers and to their frames; a rod connecting the central joints of said toggles with each other and having a length, between pivotal centers, different to the distance between the centers of said press-frames and provided with the divergent shoulders 33 and 34; the lever 31 pivoted to said rod and depending between said shoulders; the driving-shaft 19; the pinion 22 and the disk 23 mounted upon and revoluble with said shaft 19; the clutch-pulley 24 mounted loosely upon said shaft; the ratchet-ring 35 carried by said pulley; the pawl 37 carried by the disk 23; the spring 39 and plunger 40 arranged to press said pawl into engagement with said ratchet; the trip-pin 42 a spring for normally holding said trip-pin in position to disengage said pawl from engagement with said ratchet; means for retracting said trip-pin; the shaft 26; the gear-wheel 25 and the disk 27 secured upon and revoluble with said shaft 26; the crank-pin 28 and the connecting-rod 29 mounted at one end upon the crank-pin 28 and pivoted at its other end to the lower end of the lever 31, all as set forth.

In testimony whereof I have signed my name to this specification, in the presence of two subscribing witnesses, on this 17th day of May, A. D. 1900.

GEORGE P. O'CONNOR.

Witnesses:
   N. C. LOMBARD,
   ALONZO E. STINEHORN.